J. A. MILLER.
UNDER PAN FOR AUTOMOBILES.
APPLICATION FILED DEC. 2, 1907.
925,783.
Patented June 22, 1909.
2 SHEETS—SHEET 1.
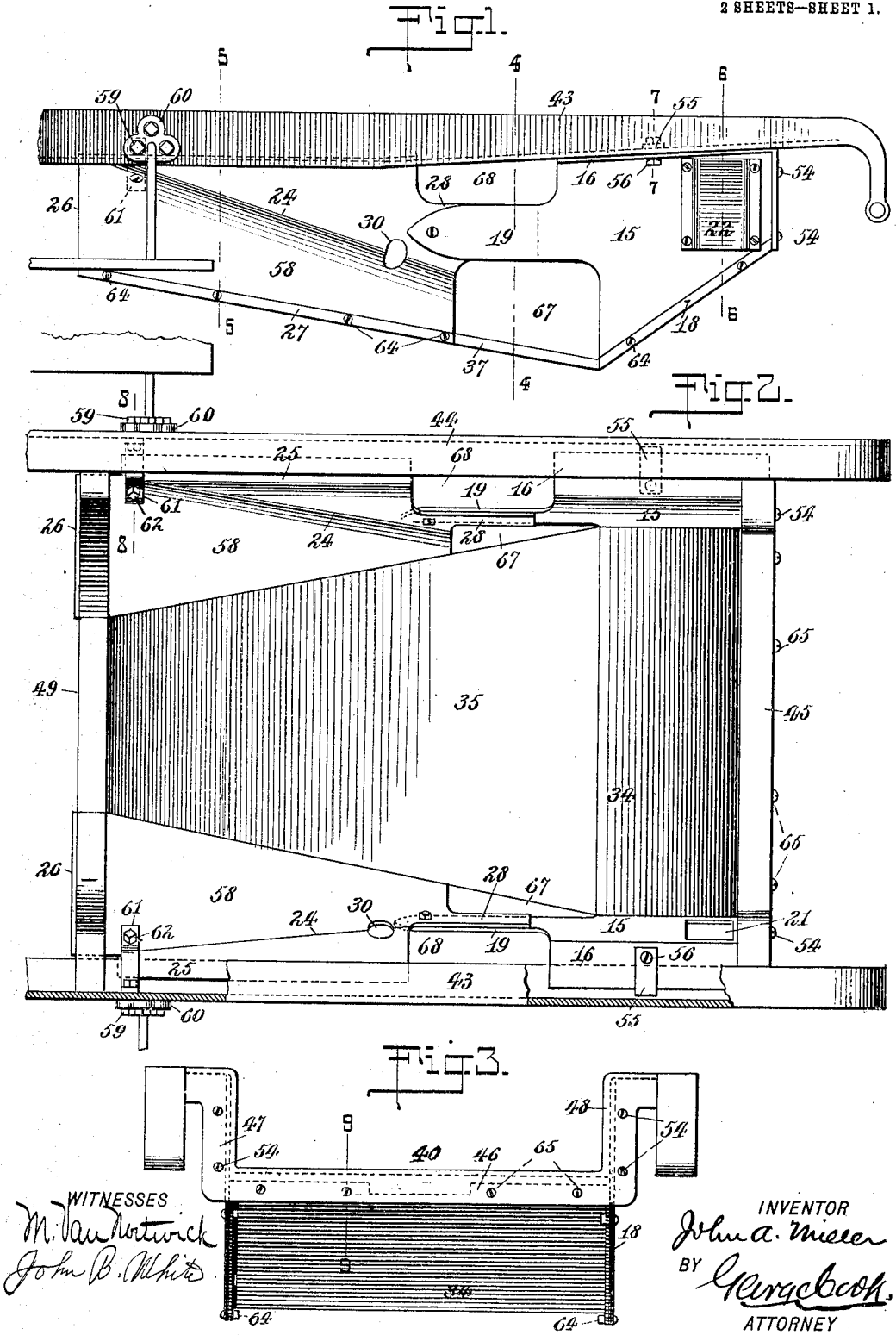

J. A. MILLER.
UNDER PAN FOR AUTOMOBILES.
APPLICATION FILED DEC. 2, 1907.
925,783.
Patented June 22, 1909.
2 SHEETS—SHEET 2.
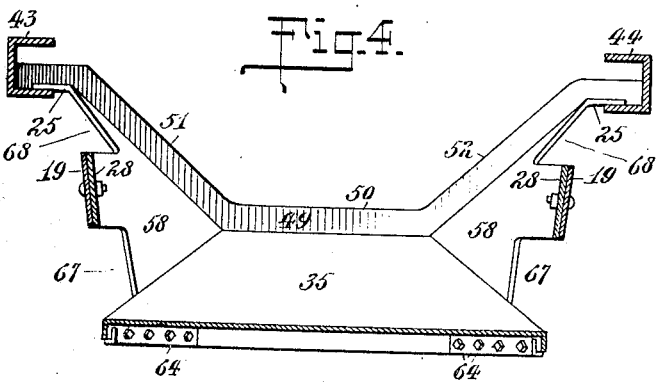
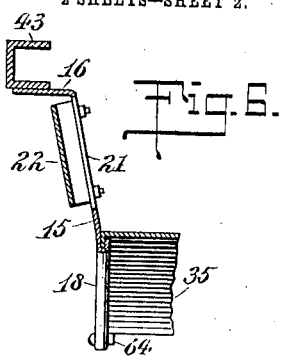
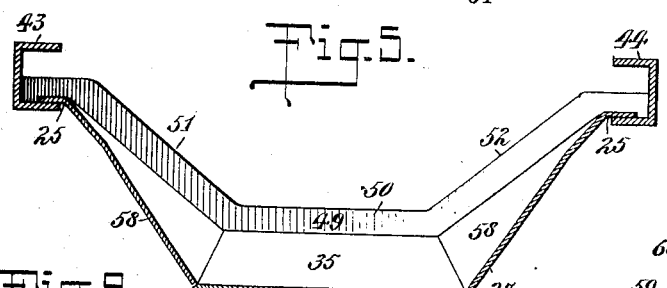
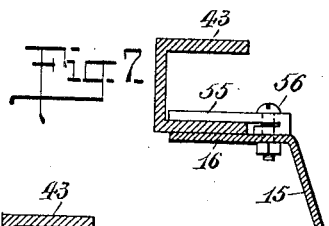
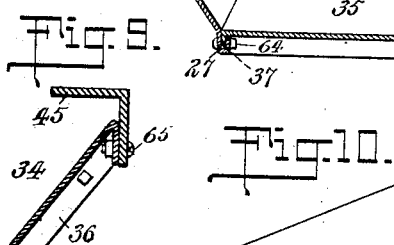
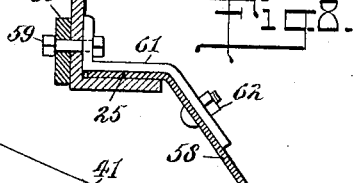
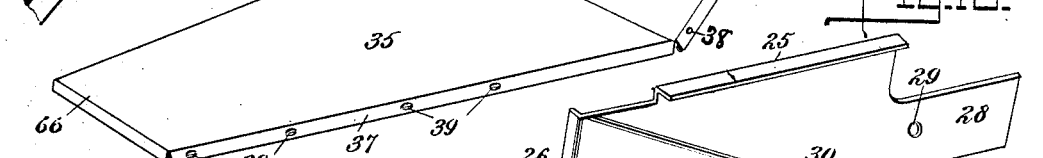
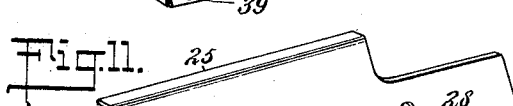
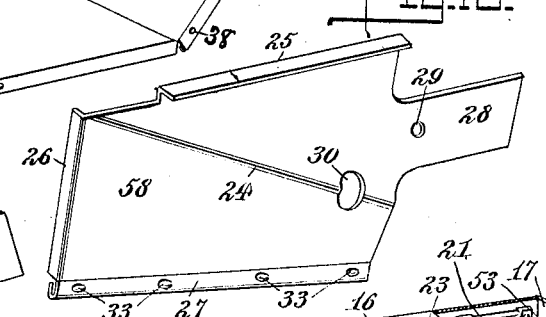
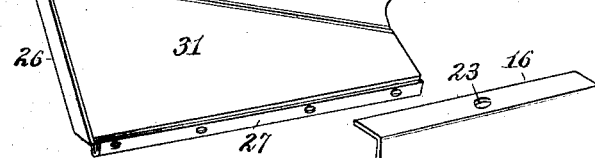
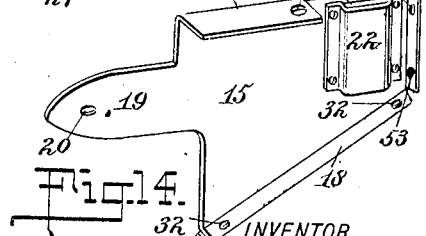
WITNESSES
M. Van Nortwick
John B. White
INVENTOR
John A. Miller
BY George Clark
ATTORNEY

UNITED STATES PATENT OFFICE.

JOHN A. MILLER, OF TARRYTOWN, NEW YORK.

UNDER-PAN FOR AUTOMOBILES.

No. 925,783.   Specification of Letters Patent.   Patented June 22, 1909.

Application filed December 2, 1907. Serial No. 404,751.

*To all whom it may concern:*

Be it known that I, JOHN A. MILLER, a citizen of the United States, and a resident of Tarrytown, in the county of Westchester and State of New York, have made and invented certain new and useful Improvements in Under-Pans for Automobiles, of which the following is a specification.

My invention relates to an under pan adapted to be attached to automobiles for the purpose of protecting the motor and working parts from dust, water or mud, thereby keeping said parts clean and free from any foreign matter, in consequence of which the various parts will be longer lived and at the same time the best power output in dusty or wet weather will be obtained.

More particularly my invention relates to an under pan comprising side sections and a bottom section secured thereto, which bottom section may be easily and quickly removed when it becomes necessary to make repairs or adjustments to any of the working parts or to the motor.

While, by way of illustration, I have shown a form of under pan which is specifically constructed for use in connection with the Maxwell Model H touring car, it will of course be understood that a pan embodying the principles of my invention may be constructed for use with any other form of automobile without departing from the spirit thereof.

With these and other ends in view, my invention consists in certain novel features of construction and combination of parts, as will be hereinafter fully described and pointed out in the claims.

In the accompanying drawings, Figure 1 is a side elevation of my device attached to the frame of an automobile. Fig. 2 is a top plan view thereof. Fig. 3 is a front elevation of the same. Fig. 4 is a sectional view taken on the line 4—4 of Fig. 1. Fig. 5 is a sectional view taken on the line 5—5 of Fig. 1. Fig. 6 is a sectional view taken on the line 6—6 of Fig. 1, one side only being shown. Fig. 7 is a similar view taken on the line 7—7 of Fig. 1. Fig. 8 is a sectional view taken on the line 8—8 of Fig. 2. Fig. 9 is a sectional view taken on the line 9—9 of Fig. 3. Fig. 10 is a perspective view of the bottom section of the pan. Figs. 11 and 12 are perspective views of the left and right rear side sections of the pan, and Figs. 13 and 14 are perspective views of the left and right front side sections.

I will first describe the construction of the various sections of which the under pan is composed, which sections may be made of galvanized sheet iron or any other suitable material, after which I will explain how they are assembled and connected with one another and with the frame or body of the automobile.

Referring to the drawings, 15 indicates the right hand front side section comprising a substantially trapezoidal shaped body portion, as shown in Fig 14 provided with outwardly extending flanges 16 and 17 at its upper and front edges respectively, said flanges being at substantially right angles to the body portion and having suitably spaced holes 23 and 53 formed therein. The lower edge, which is inclined in a rearwardly direction, is provided with a grooved flange 18 provided with suitably spaced holes 32, the edge of said flange being turned inward and upward as shown in said figure, and from the rear edge, a rearwardly extending tongue 19 projects, for a purpose hereinafter described, said tongue being provided with an opening 20 adapted to receive a bolt, screw or other fastening device.

21 is an opening formed in the body portion of the section through which the carbureter is adapted to partially project, said opening being covered by a U-shaped piece of metal 22, which is attached to the body portion in any suitable manner. It will of course be understood that the opening 21 and its protecting cover 22 may be omitted when the pan is constructed for automobiles in which the carbureter is so located that the pan will not interfere therewith when it is placed in position. The left-hand front side section 57, shown in Fig. 13, is similar in all respects to the one described, excepting that the opening 21 and cover 22 are omitted, as they are not necessary.

58 indicates the right hand rear side section comprising a substantially rectangular body portion, the lower part of which is bent slightly inward along the diagonal line 24 as shown in Fig. 12, said body portion being provided with an outwardly extending flange 25 throughout a portion of its upper edge, and an inwardly extending flange 26 at its inner edge. The lower edge, which is inclined toward the front, is provided with a grooved flange 27, provided with suitably spaced holes 33, the edge of said flange being bent inward and upward as shown in said figure, and from the front edge of the section, a forwardly extending tongue 28 projects, for a purpose hereinafter described, said tongue being provided with an opening 29, adapted to receive a bolt, screw or other suitable fastening device. At a suitable place, the body of the section is provided with an opening 30, through which the steering post or rod is adapted to pass. The left hand rear section 31, shown in Fig. 11, is similar in all respects to the one described, excepting that the opening 30 is omitted, it being of course unnecessary.

The bottom section, which is preferably made from a single piece of metal, is shown in Fig. 10, and comprises a substantially rectangular front portion 34 and a trapezoidal shaped rear portion 35, inclined at an angle with one another, as shown, said portions being provided at their side edges with downwardly extending flanges 36 and 37, respectively, the flanges 36 having holes 38 formed therein adapted to register with the holes 32 in the front side sections 15, and the flanges 37 having holes 39 formed therein, adapted to register with the holes 33 in the rear side sections. At the central portion of the front edge of the portion 34, is a suitable notch or recess 40, into which a portion of the frame is adapted to fit, and on either side of said notch are the downwardly extending flanges 41, provided with suitable holes which are adapted to register with suitably spaced holes in the radiator cross member, as hereinafter described.

Having described the construction of the sections of the under pan, I will now describe the manner of assembling the same and explain how they are attached to one another and to the frame or body of the automobile. For the sake of clearness, I have shown only those parts of the frame or body which are necessary for a full understanding of the manner of securing the under pan thereto, said parts comprising the longitudinal side members 43 and 44, preferably consisting of channel bars and positioned with their open sides facing inwardly as clearly shown in Fig. 4; the radiator cross member 45, preferably consisting of an angle iron (see Fig. 9), bent to form a horizontal portion 46, and vertical end portions 47, 48, the upper ends of which are bent outwardly to provide means whereby the member may be attached to the side members 43 and 44; and the transmission supporting cross-member 49, which is bent or formed to comprise the horizontal portion 50, and the upwardly and outwardly extending arms 51 and 52, the extreme ends of which are bent to engage with the side members 43 and 44, whereby the cross member will be retained in position, as clearly shown in Fig. 4.

To secure the front side section 15 in position, holes are drilled in the vertical end member 47 of the radiator cross-member 45, which holes register with the holes 53 in the flange 17, and bolts or other suitable fastening devices 54 are passed through said holes, whereby the flange 17 is tightly held against the inner face of said member 47. The section 15 is so positioned that the flange 16 will rest against the under side of the side member 43, as shown in Fig. 7, with which it is held in contact by a clip 55, preferably J-shaped as shown, the long arm of said clip resting upon the inner surface of the lower flange of the side member 43, and the flange 16 being secured thereto by a bolt or other suitable fastening device 56, which passes through the hole 23 in the flange 16. It will of course be understood that I may use any other suitable form of clip without departing from the spirit of my invention. The opposite front side section 24 is secured in position in a similar manner.

To secure the rear side section 58 in position, I preferably, for convenience, make use of the rear bolt 59 of the support or hanger 60, by which to secure a clip 61 to the side member 43, between the lower flange of which and said clip, the flange 25 of the section 58 is secured, said section being fastened to the clip by a bolt or other suitable fastening device 62, as clearly shown in Fig. 8. When this section of the pan is in position, its rear flange 26 will frictionally engage the rear face of the inclined arm 51 of the cross member 49, as shown in Fig. 2. The tongue 19 of the front section 15 is adapted to overlap and engage with the tongue 28 of the rear section 58, to which it is secured by a bolt or other suitable fastening device 63, which passes through the registering holes 20 and 29. The opposite rear side section 31 is secured to the frame in a similar manner.

After the side sections have been secured to the frame, as above described, the bottom section is placed in position with the flanges 36 and 37 engaging with the grooved flanges 18 and 27, as clearly indicated in Figs. 4, 5 and 6, the side sections being adapted to give or be sprung outwardly sufficiently to permit the bottom section to be inserted between their lower edges for this purpose. When the bottom section is in position, the holes 38 and 39 will register with the holes 32 and 33, and bolts or other suitable fastening devices 64 are passed therethrough whereby said section is firmly held in place. At the front edge of the bottom section, the holes in the flanges 41 are adapted to register with corresponding holes in the horizontal portion 46 of the radiator cross member 45, and bolts or similar fastening devices 65 are passed therethrough to firmly secure said section to said cross member. When secured in place, the rear edge 66 will abut against the lower side of the horizontal portion 50 of the cross-member 49. While I have shown the bottom section of the pan as being held in position by means of bolts, it will of course be understood that any other suitable fastening devices may be employed, it being only necessary that such devices should hold the bottom section firmly in place, and at the same time be capable of being easily and quickly withdrawn in order that the bottom section may be removed.

When the pan is assembled and in position upon the frame or body of the automobile, the sides thereof will be provided with openings 67 and 68, due to the overlapping rearwardly and forwardly extending tongues 19 and 28, as clearly shown in Fig. 1, which openings are for the purpose of allowing the axle, journals and other portions of the mechanism to project therethrough.

When it is necessary to have access to the motor or the working parts for repair or adjustment of the parts, it is simply necessary to remove the fastening devices 64 and 65, push the bottom section upward until its flanges 36 and 37 are disengaged from the grooved flanges 18 and 27 of the side sections, then press the side sections slightly outward until said grooved flanges are clear of the flanges on the bottom section, after which the bottom section may be easily withdrawn. After the repairs or adjustments are made, it is replaced by reversing the various steps described.

It will be seen from the above description that I have invented an under pan which will be very efficient in operation and by means of which the motor and working parts will be protected from foreign matter, which will readily admit of access to said parts, which will be cheap to manufacture, and which may be easily and quickly placed in position and removed therefrom.

Having fully described my invention, what I claim as new and desire to secure by Letters Patent, is:—

1. In an under pan for use with automobiles, the combination of sectional side members adapted to be supported by the frame of an automobile, said members having their lower edges provided with grooves, of a bottom member having its side edges provided with flanges to detachably engage said grooves, substantially as described.

2. In an under pan for use with automobiles, the combination with side sections provided with upper flanges by which they may be secured to the frame of an automobile, and having grooved flanges at the lower edges, of a bottom member having its side edges fashioned to detachably engage the flanged grooves of the side members, substantially as described.

3. In an under pan for use with automobiles, the combination with side members adapted to be supported by the frame of an automobile, said members having their lower edges turned inwardly to form longitudinally extending grooves, of a bottom member having its edges turned downwardly to removably fit the grooves of the side members, whereby access may be had to the motor and working parts of the automobile upon the removal of said bottom member, substantially as described.

4. In an under pan for use with automobiles, the combination with side members adapted to be supported by the frame of an automobile, each of said members being formed of sections and each of said sections having its lower edges provided with longitudinally extending grooved flanges, of a single bottom member having its side edges removably engaging the grooved flanges of the sections of the side members whereby access may be had to the motor and working parts of the automobile, upon the removal of said bottom member, substantially as described.

5. In an under pan for use with automobiles, the combination with side members having flanges along their upper edges by which they may be supported from the frame of an automobile, said side members having their lower edges provided with grooved flanges, of a bottom member having its side edges detachably secured to the lower flanges of the side members, substantially as described.

6. In an under pan for use with automobiles, the combination with side members adapted to be supported by the frame of an automobile, and provided with grooved flanges, of a bottom member provided with flanges engaging with said grooved flanges, whereby the bottom member is supported by said side members, substantially as described.

7. In an under pan for use with automobiles, the combination with side sections provided with upper and lower flanges, said upper flanges being adapted to be secured to the frame of the automobile, of a bottom section provided with flanges co-acting with said lower flanges, and removable means uniting said co-acting flanges, substantially as described.

8. In an under pan for use with automobiles, the combination with side members each formed of a plurality of sections, said members adapted to be supported by the frame of an automobile, and said sections being cut away at points to allow parts of the automobile to pass therethrough, of a bottom member fitting between the lower edges of the side members, the lower edges of said side members and the side edges of the bottom member having interengaging flanges, substantially as described.

9. In an under pan for use with automobiles, the combination with front side sections adapted to be secured to the frame of an automobile, and provided with rearwardly extending tongues, of rear side sections adapted to be secured to said frame and provided with forwardly extending tongues secured to said first mentioned tongues, and a bottom section supported by said side sections, substantially as described.

10. In an under pan for use with automobiles, the combination with side members adapted to be supported by the frame of an automobile, each of said members being provided with grooved flanges along the lower edges and one of said members being provided with an opening adapted to receive the carbureter, of a bottom member having side flanges detachably engaging the grooved flanges of said side members, substantially as described.

11. In an under pan for use with automobiles the combination with side members adapted to be supported by the frame of an automobile, said members having grooved flanges along their upper edges and one of said members being provided with a covered opening adapted to receive the carbureter, of a bottom member having flanges along its side edges adapted to engage the grooved flanges of the side members to thereby detachably secure the bottom to the side members, substantially as described.

12. In an under pan for use with automobiles, the combination with side members adapted to be supported by the frame of an automobile, said members having grooved flanges extending along their lower edges, of a bottom member extending between said side members comprising an upwardly extending front portion having flanges along its side edges adapted to detachably engage corresponding grooves in the side members, substantially as described.

13. In an under pan for use with automobiles, the combination with side members adapted to be supported by the frame of an automobile, said members having grooved flanges along their lower edges, of a bottom member disposed between the side members, said bottom member having a flange along its front edge whereby it may be secured to the frame of an automobile, substantially as described.

14. In an under pan for use with automobiles, the combination with side members comprising front and rear sections, said sections having their lower edges provided with inwardly-turned flanges and said rear sections having inwardly bent portions, of a bottom member disposed between the side members and having flanges along its side edges adapted to engage the grooved flanges of the side members, substantially as described.

Signed at New York, borough of Manhattan, in the county of New York, and State of New York, this 11th day of November, A. D. 1907.

JOHN A. MILLER.

Witnesses:
WILLIAM P. JONES,
JOHN B. WHITE.